(12) United States Patent
Norén et al.

(10) Patent No.: US 11,485,581 B2
(45) Date of Patent: Nov. 1, 2022

(54) AIR BALANCE TUNNEL FOR SPIRAL CONVEYOR

(71) Applicant: John Bean Technologies AB, Helsingborg (SE)

(72) Inventors: Kenny Tobias Norén, Råå (SE); Nedjada Ribic, Helsingborg (SE); Patrik Torbjörn Dalhult, Påarp (SE); Lars Johan Siljeborn, Dalby (SE)

(73) Assignee: John Bean Technologies AB, Helsingborg (SE)

( * ) Notice: Subject to any disclaimer, the term of this patent is extended or adjusted under 35 U.S.C. 154(b) by 485 days.

(21) Appl. No.: 16/666,898

(22) Filed: Oct. 29, 2019

(65) Prior Publication Data
US 2021/0122577 A1    Apr. 29, 2021

(51) Int. Cl.
| A21B 1/42 | (2006.01) |
| A23L 3/06 | (2006.01) |
| B65G 21/10 | (2006.01) |
| B65G 21/08 | (2006.01) |

(52) U.S. Cl.
CPC ............. B65G 21/10 (2013.01); B65G 21/08 (2013.01); *B65G 2207/24* (2013.01)

(58) Field of Classification Search
CPC .... B65G 21/08; B65G 21/10; B65G 2207/24; A23L 3/06; A21B 1/42
USPC ................. 198/778; 414/222.11; 99/443 C; 126/21 A
See application file for complete search history.

(56) References Cited

U.S. PATENT DOCUMENTS

| 3,938,651 A | 2/1976 | Alfred et al. |
| 4,576,090 A * | 3/1986 | Burtea .................. A21B 1/245 219/400 |
| 5,226,295 A | 7/1993 | Jaxmar |

(Continued)

FOREIGN PATENT DOCUMENTS

| EP | 2 022 333 A1 | 2/2009 |
| WO | 2012/122491 A1 | 9/2012 |
| WO | 2018/118850 A1 | 6/2018 |

OTHER PUBLICATIONS

International Search Report and Written Opinion dated Dec. 2, 2020, issued in International Patent Application No. PCT/EP2020/079091, filed Oct. 15, 2020, 13 pages.

*Primary Examiner* — Douglas A Hess
(74) *Attorney, Agent, or Firm* — Christensen O'Connor Johnson Kindness PLLC (57) ABSTRACT

A thermal processing apparatus (20) includes a spiral conveyor system (22) configured into an ascending spiral stack (26). An air balance tunnel (40) includes a tunnel housing (76) positioned inside of a thermal processing chamber adjacent an outlet opening (36). A conveyor belt (24) travels through the housing on its way out of the processing chamber. An air pervious ejector assembly (78) is positioned within the housing at an elevation above the conveyor belt (24). An air pervious evacuation sheet (80) is located within the housing at a location beneath the conveyor belt (24). An air pervious cover assembly (150) is positioned over the conveyor belt (24) at a location just before the conveyor belt enters the air balance tunnel (40). The cover sheet (150) is connectable to the ejector assembly (78) so as to remove the ejector assembly from the tunnel housing (76) by manually moving the cover assembly (150).

20 Claims, 8 Drawing Sheets

(56) References Cited

U.S. PATENT DOCUMENTS

| | | | |
|---|---|---|---|
| 5,247,801 A | 9/1993 | Jaxmar et al. | |
| 5,673,681 A | 10/1997 | Neitzel et al. | |
| 5,803,232 A | 9/1998 | Fröderberg | |
| 6,912,869 B2* | 7/2005 | Lang | A21B 1/245 62/380 |
| 6,933,473 B2 | 8/2005 | Henke et al. | |
| 7,026,579 B2* | 4/2006 | Burtea | A21B 1/48 99/443 C |
| 7,107,899 B2* | 9/2006 | Nothum, Jr. | A21B 1/42 99/443 C |
| 9,044,023 B2* | 6/2015 | Ajmera | A21B 1/48 |
| 9,052,117 B2* | 6/2015 | Ajmera | A21B 3/00 |
| 10,039,304 B2* | 8/2018 | Ohrlander | A23L 3/001 |
| 10,912,317 B2* | 2/2021 | Svensson | B65G 21/18 |
| 11,266,152 B2* | 3/2022 | Miersch | A21B 1/26 |
| 11,291,210 B2* | 4/2022 | van de Rijt | A47J 37/0754 |

* cited by examiner

AIR BALANCE TUNNEL FOR SPIRAL CONVEYOR

BACKGROUND

Spiral conveyor based thermal processing systems, including systems employing self-stacking conveyors, provide a cooking surface or a cooling/freezing surface in the form of a pervious self-stacking conveyor belt for conveying work products, including food, through a thermal processing chamber in a spiral or helical path. The self-stacking conveyor belt is arranged in and travels in circular tiers from the bottom of the spiral stack to the top and then perhaps in a second stack the conveyor belt travels from the top back down to the bottom of the stack. The bottom conveyor belt tier rests on and is driven by inner and outer drive chains which in turn are supported on roller chains or ball chains that ride on support rails. The conveyor belt enters the thermal processing chamber through an entrance opening typically at or near the bottom of the chamber and exits the chamber at or near the top of the chamber in a single stack arrangement. In a dual conveyor stack arrangement, the conveyor belt typically exits the chamber through an exit opening at a location or near the bottom of the chamber.

If the work product is being cooked or otherwise heated, a heat source, such as steam, hot air, or mixtures thereof, is provided within or adjacent the cooking chamber for cooking the work products. Correspondingly, if thermal processing is in the form of cooling or freezing, then a source of cooling medium is provided either within the cooling/freezing chamber or adjacent thereto.

An advantage of thermal processing systems utilizing spiral conveyor belts, including self-stacking belts, is that a relatively long processing path can be achieved with a small footprint. For example, a 600 foot long thermal processing conveyor belt in a spiral configuration can be contained within a 20 foot×20 foot×20 foot housing. However, spiral stack conveyor thermal processing systems do have drawbacks from a linear oven of a comparable length. In a linear oven, the upper and lower surfaces of the work products being carried on a linear conveyor are exposed to being efficiently impinged upon by the thermal processing medium. However, in a spiral oven or freezer, the work product is not as directly accessible to the thermal processing medium since the work products are arranged in stacked layers, thus requiring less direct thermal processing methods than direct impingement of the thermal processing medium onto the work product.

In one form of spiral stack conveyors, a fan system is used to direct the flow of the thermal processing medium vertically through the annulus of the spiral conveyor, either in the upward or downward direction, as well as to some extent horizontally across the layers of the spiral stack. One difficulty in this type of thermal processing medium flow arrangement is to achieve uniform thermal processing across the conveyor since typically the work product is arranged in multiple lanes with variable spacing along the conveyor. When the conveyor belt is in straight configuration, the work products can be fairly uniformly spaced across and along the conveyor. However, when the conveyor curves into a spiral, the work products on the inside of the conveyor become relatively closer together, whereas the work products on the outside of the conveyor become relatively further apart. As such, the work products on the inside of the conveyor tend to receive less thermal processing medium per work product relative to the work products located on the outside of the conveyor. As such, attempts have been made to direct at least some of the thermal processing medium across the levels or flights or tiers of the conveyor, typically from the outside toward the center of the spiral.

Other techniques that have been employed in an effort to more uniformly thermally treat work products in a spiral stack conveyor include reversing the direction of flow of the thermal treatment medium while the work product is moving along the spiral conveyor. For example, during part of the processing cycle, the thermal processing medium may be directed upwardly through the annulus of the spiral, and then later in the thermal process, the direction of flow of the processing medium may be reversed to flow from the top of the conveyor stack down.

Another effort in achieving more uniform thermal processing is to employ baffles or mezzanines around and/or within the center of the spiral conveyor to control the direction of the thermal processing medium flow through the spiral stack. In this regard, one or more inner mezzanines have been positioned with the center of the spiral stack to essentially divide the spiral stack into different thermal processing zones. For example, a first upper thermal processing zone may be at a higher pressure, and a second lower thermal processing zone may be at a lower pressure. An outer mezzanine may also be positioned around the spiral stack and extending to the inner walls of the thermal processing chamber.

Regardless of the configuration of the thermal processing medium circulation system, the pressure in the at least portions of the thermal processing chamber is higher than the ambient. For that reason and for reasons of hygiene, it is important to retain the thermal processing chamber substantially sealed from the exterior, even though work products need to enter and exit the thermal processing chamber. As noted above, the thermal processing chamber has entrance and exit openings for the traveling conveyor belt. Various types of mechanisms and devices have been utilized to attempt to seal the thermal processing chamber from the exterior. For example, a curtain of flexible strips, constructed of a sheet material, such as Teflon®, plastic or fabric coated with Teflon®, have been hung over the entrance and exit openings of the thermal processing chamber. Such curtains do reduce thermal processing medium leakage, and the curtain strips are flexible enough to conform to the shapes of the moving conveyor belt and work products being carried on the conveyor belt. However, the curtain strips require cleaning at high frequency to reduce the possibility that microorganisms will lodge on the curtain strips.

Another sealing mechanism consists of directing a curtain of relatively high velocity air over the entrance and exit openings interior of the thermal processing chamber for balancing the air pressure differences across the inlet and outlet openings, thus minimizing the air flow through these openings. To this end, a tunnel structure, to produce the air curtain, is positioned within the thermal processing chamber adjacent to the inlet and outlet openings. As the conveyor belt travels through the tunnel structure, air from a fan is forced through an upper ejector sheet located above the conveyor to direct the air down and at an angle away from the outlet or inlet. This air next flows through the pervious conveyor belt and then through an evacuation sheet positioned below the belt. The evacuation sheet helps evacuate the air from the tunnel without creating excessive horizontal air movement thereby seeking to avoid disturbing the work products being carried on the conveyor.

Periodically, it is necessary to clean the upper ejector sheet as well as the lower evacuation sheet. This is performed by lifting the ejector sheet and evacuation sheets out of the tunnel structure. This operation can be cumbersome due to the relatively large sizes and the weights of the ejector sheet and evacuation sheet. Also, it is often difficult to correctly replace the ejector sheet and evacuation sheet back so as to prevent the curtain air from bypassing the ejector sheet or the evacuation sheet.

The present disclosure provides a tunnel construction that seeks to address the shortcomings of existing air balance tunnel structures.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, an air balance system for a thermal processing system having a conveyor transporting work products into and/or out of a thermal processing chamber through one or more openings in the chamber, the system comprising:

a. a tunnel housing positioned within the chamber at the conveyor adjacent a chamber opening, the tunnel housing configured to enable the conveyor to pass through the tunnel housing;

b. a frame structure configured to support an air pervious ejector sheet over the conveyor and for movement into and out of the tunnel housing in a direction along the travel path of the conveyor; and c. the tunnel housing configured to direct air through the ejector sheet and through the conveyor to create an air curtain at the chamber opening through which the conveyor passes.

In any embodiment described herein, the frame structure supports the ejector sheet for sliding movement out of and into the tunnel housing in a direction along the length of the conveyor to provide access to the ejector sheet.

In any embodiment described herein, the tunnel housing having portions defining slideways for supporting the frame structure for sliding movement out of and into the tunnel housing.

In any embodiment described herein, further comprising a support structure mounted within the tunnel housing below the conveyor configured to support an air pervious evacuation sheet.

In any embodiment described herein, wherein the evacuation sheet is configured to be disposed in sloped orientation when in a fully inserted position.

In any embodiment described herein, where the evacuation sheet is supported for movement between a fully inserted position within the tunnel housing and a retracted position exterior to the tunnel housing.

In any embodiment described herein, wherein the support structure is mounted in the tunnel housing to enable the evacuation sheet to slide in and out of the tunnel housing in a direction along the length of the conveyor to provide access to the evacuation sheet.

In any embodiment described herein, wherein the tunnel housing is configured to direct air downward through the ejector sheet, downwardly through the conveyor, and downwardly through the evacuation sheet.

In any embodiment described herein, wherein the tunnel housing directs pressurized air from a source of pressurized to travel along a path laterally of the conveyor to direct air to a location above the ejector sheet.

In any embodiment described herein, wherein the source of pressurized air comprises a fan driven by a power source positioned laterally to the conveyor.

In any embodiment described herein, wherein the conveyor is a spiral conveyor positioned within the chamber having an outlet opening through which the spiral conveyor exits the chamber, and the tunnel housing is positioned at the spiral conveyor adjacent the chamber outlet opening.

In any embodiment described herein, further comprising an air pervious cover sheet positioned over a portion of the conveyor prior to entrance into the tunnel housing.

In any embodiment described herein, further comprising flanges for supporting the cover sheet over the conveyor.

In any embodiment described herein, wherein the flanges support the cover sheet to move toward and away from the tunnel housing in a direction along the length of the conveyor.

In any embodiment described herein, further comprising laterally spaced apart rails projecting from the tunnel housing along the length of the conveyor for supporting the cover sheet flanges for movement along the rails in a direction along the length of the conveyor.

In any embodiment described herein, wherein the ejector sheet is connectable to the cover sheet to move into or out of the tunnel housing with the cover sheet as the cover sheet moves towards and away from the tunnel housing.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right-hand," left-hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definitive, the applicable parameter is within five percent (5%) of the designated parameter value.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application and claims, any references to "food," "food products," "food pieces," and "food items," are used interchangeably and are meant to include all manner of foods. Such food products may include meat, fish, poultry, fruits, vegetables, nuts, herbs, spices, grains, pasta, bread dough, pizza dough, or other types of dough, as well as other types of foods. Also, the present systems and methods are directed to raw food products, as well as partially and/or fully thermally processed food products.

Further, the system, apparatus, and methods disclosed in the present application and defined in the present claims, though specifically applicable to food products or food items, may also be used outside of the food area. Accordingly, the present application and claims reference "work products" and "workpieces," which terms are synonymous with each other. It is to be understood that references to work products and workpieces also include food, food products, food pieces, and food items.

The present application and claims in part relate to systems and methods for the thermal processing of work products, including food products. In the illustrated embodiment of FIGS. 1 and 2, the thermal processing of the work product may be directed at a freezer for freezing work products or to an oven for cooking work products. In this regard, the thermal processing apparatus 20 includes a spiral conveyor system 22, which may be in the form of a self-stacking conveyor, wherein the conveyor belt 24 is arranged as an ascending spiral stack 26. A circulation system 30 delivers a gaseous thermal processing medium to the work products disposed on the spiral stack 26. The spiral stack 26 is contained within a thermal processing chamber 32, and the circulation system 30 circulates the thermal processing fluid within the chamber. The conveyor belt 24 supports and transports work products through the spiral stack 26. The conveyor belt 24 enters the chamber through a lower inlet opening 34 and exits the chamber through an upper outlet opening 36. An air balance tunnel 40 is positioned just inside the outlet opening 36 to prevent, or at least minimize, flow between the thermal processing chamber 32 and the ambient. Although not shown, a similar air balance tunnel can be located just inside the inlet opening 34.

Thermal Processing Chamber

Figure 1:
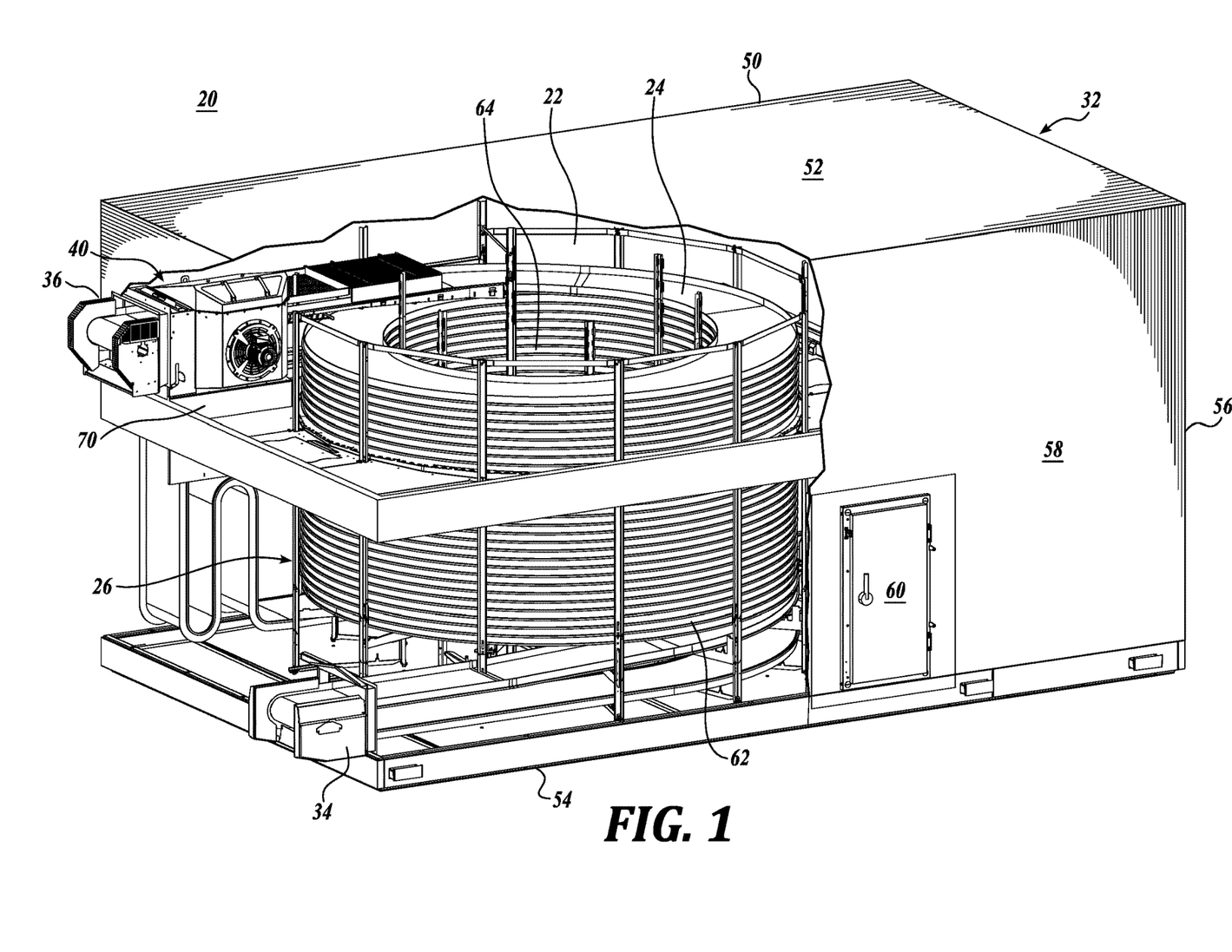
FIG. 1 is a pictorial view of a thermal processing system including an air balance tunnel of the present disclosure disposed within a thermal processing chamber.
Figure 2:
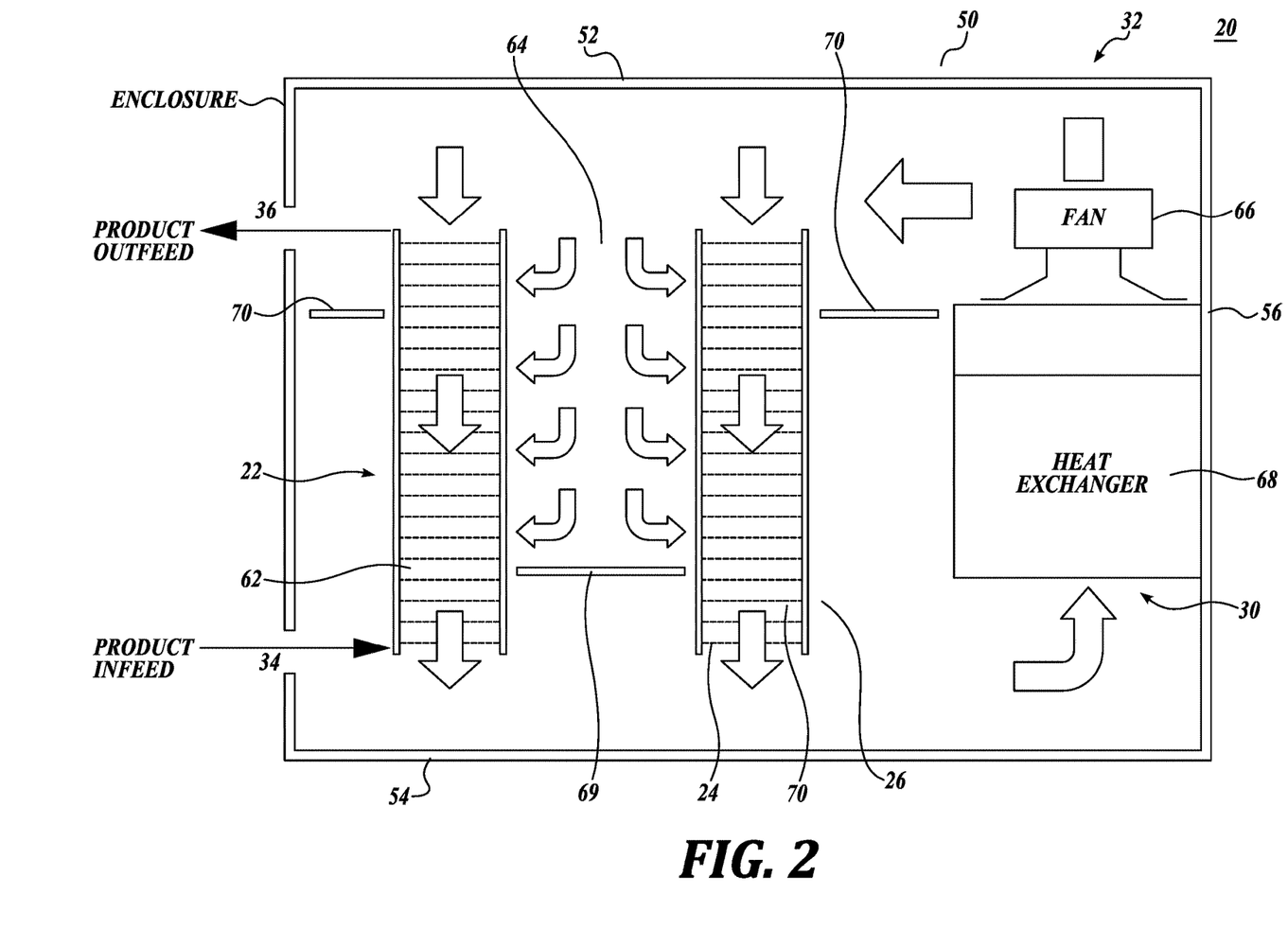
FIG. 2 is a partial schematic cross-section view of FIG. 1.
Figure 3:
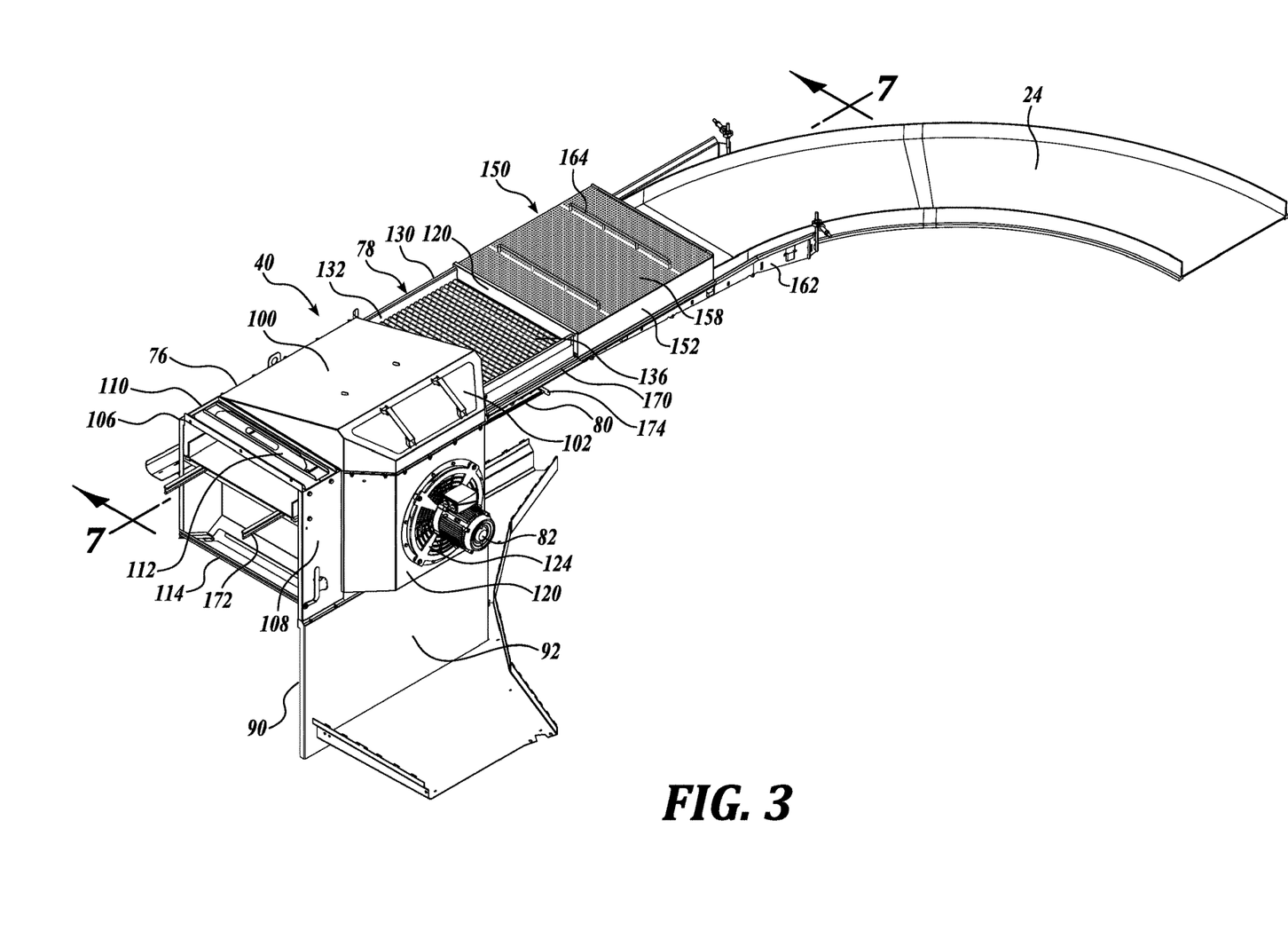
FIG. 3 is a partial pictorial view of FIG. 1.
Figure 4:
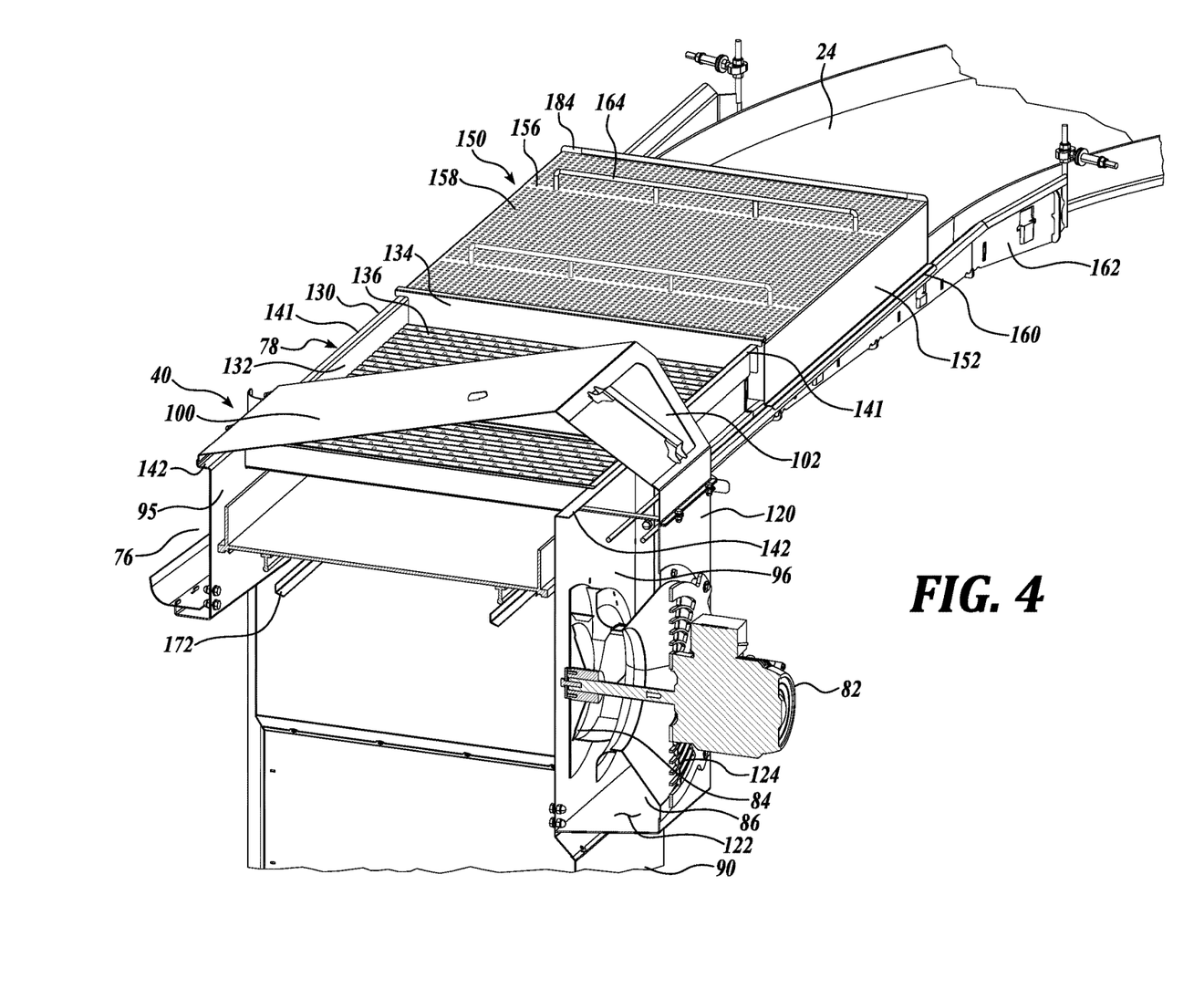
FIG. 4 is an enlarged fragmentary view of FIG. 1 with portions shown in cross section.

Next describing thermal processing system 20 in greater detail, as shown in FIGS. 1 and 2, the thermal processing chamber 32 includes an insulated housing 50 that can be of various constructions and shapes. For example, the housing 50 can be generally rectilinear or generally cylindrical in shape or in other shapes to accommodate the belt stack 26, as well as the other components of system 20 located within the housing, including circulation system 30. The housing 50 includes a ceiling 52, a floor 54, end walls 56, and side walls 58. Access doors 60 are located in an end wall and the side wall. As noted above, the housing also includes an inlet opening 34 located at a lower portion thereof through which work products enter the housing, and an outlet opening 36 in an upper portion of the housing through which the work products exit the housing.

As also noted above, belt stack 26 is located within the interior of housing 50, with the conveyor traveling in an ascending helical path entering the bottom of housing 50 through entrance opening 34 and then exiting the housing 50 through outlet opening 36 at an upper location in the housing. Although a single belt stack 26 is shown as positioned within the housing 50, the housing can be adapted to contain other numbers of belt stacks. For example, a second belt stack may be located adjacent belt stack 26 wherein the conveyor travels in a descending helical path before exiting the hosing at a lower portion of the housing.

Conveyor Belt

Examples of spiral stacking belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

Referring to FIGS. 1 and 2, when arranged as a spiral stack 26, the pervious conveyor belt 24 is configured into a plurality of superimposed flights or tiers 60 that are stacked on top of each other (i.e., known in the art as "self-stacking" conveyor belts). In that regard, each tier 60 of the stack 26 forms a pervious annulus, through which gaseous thermal processing medium may travel. When formed in spiral stack 26, the plurality of tiers 62 creates an inner cylindrical channel 64, through which the thermal processing medium may also travel. The work products travel on the conveyor belt 24 and are treated by thermal processing medium in the chamber 32. An exemplary spiral stack 26 may have any number of tiers 60, typically in the range of about 8 to about 45 tiers.

Thermal Processing Medium Circulation System

As noted above, numerous systems and methods have been employed to route the thermal processing medium through the chamber in a desired direction(s) and velocities. In the present disclosure, the air circulation system 30 employs a circulation fan 66 disposed within the chamber 32 alongside the spiral stack 26. The circulation fan 66 draws processing medium downwardly through the annular interior of the spiral stack 26 so as to thermally treat the work products being carried on the conveyor belt 24 and then directing the spent processing medium upwardly alongside wall 56 of the housing 50 to the top of the housing 50.

During the upward travel of the processing medium, the fan 66 directs the processing medium through a heat exchanger 68 to either heat the processing medium or cool the processing medium depending on the function of the thermal processing system 20. The fan 66 directs the heated/cooled thermal processing medium downwardly through the top of the spiral stack 26 as well as into the center 64 of the spiral stack from which location the thermal processing medium flows laterally into the anulus of the spiral stack to provide thermal processing of the work product carried by the conveyor.

Mezzanine 69 is positioned within the interior or center 64 of the spiral stack to essentially divide the spiral stack into an upper thermal processing zone of a higher pressure and a lower thermal processing zone at a lower pressure. Also, an outer mezzanine 70 encircles the spiral stack 26 and extends to the inner walls 56 and 58 of the thermal processing chamber housing. The outer mezzanine 70 also divides the thermal processing chamber into an upper, higher pressure thermal processing zone as well as a lower, lower pressure processing zone.

Air Balance Tunnel

As noted above, the present disclosure pertains to air balancing tunnels 40 for helping isolate the housing 50 from the ambient thereby seeking to prevent, or at least minimizing, the flow of processing fluid out of the housing 50 through inlet and outlet opening 34 and 36 as well as preventing, or at least minimizing, the flow of ambient air into the housing through openings 34 and 36.

In basic form, the air balance tunnels 40 include a tunnel housing 76 positioned inside of the thermal processing chamber housing 50 adjacent outlet opening 36. The conveyor belt 24 travels through the housing 76 on its way out of the thermal processing chamber 32. The tunnel 40 also includes an ejector assembly 78 positioned within the housing 76 at an elevation above the conveyor belt 24. In addition, an evacuation sheet 80 is located within the housing 76 at a location beneath the conveyor belt 24. A motor 82 powers a circulation fan 84 to direct an air stream upwardly through a side chamber 86 located alongside of the housing 76 and then across the top of the housing so that the air stream passes downwardly through the ejector assembly 78, then through the pervious conveyor belt 24 and next through the evacuation sheet 80 to the bottom of the housing 76 for return into the thermal processing housing 50. In this manner, an air curtain is created that flows downwardly across the chamber outlet opening 36, which seeks to isolate the interior of the thermal processing chamber 32 from the ambient. In other words, the flow of processing medium and ambient air through the outlet opening 36 is prevented or at least minimized.

In describing the foregoing components of the tunnel 40 in more detail, the tunnel housing 76 is in the form of a generally cubic shaped body which is supported on a base structure 90 at an elevation above the outer mezzanine 70 to be in registry with the conveyor belt 24. In this regard, the base structure 90 includes an inward (relative to the exterior of the housing chamber housing 50) side panel 92 and in inward end panel 94. The tunnel housing 76 itself includes outward and inward side panels 95 and 96 as well as an inward end panel 98. Openings are formed in the inward end panel 98 through which the conveyor 24 enters the tunnel housing 76. The opening in the end panel 98 also accommodates the ability of the ejector assembly 78 to pass in and out of the housing 76. In addition, the opening in the end panel 98 accommodates the ability of the evacuation sheet 80 to slide in and out of the housing 76.

The housing 76 is formed with a sloped top or cover 100 with the slope being downward toward the "outward" side of the housing 50, located adjacent the thermal processing chamber side wall 58. As discussed above, the reason for the sloped top or ceiling 100 is to facilitate the directing of an air stream from circulation fan 84 downwardly through the tunnel housing 76. An access hatch 102 located at the top of side chamber 86, is pivotally connected to the top 100 to provide access to the interior of the housing 76, for instance for cleaning the interior of the tunnel 40 or for cleaning the evacuation sheet 80, as described below.

An interface structure 106 is positioned between the downstream side of the tunnel housing 76 and the adjacent end wall 56 of the thermal processing chamber housing 50 to bridge the distance therebetween. The interface structure 106 includes side panels 108 extending between the housing 76 and chamber end wall 56. A top panel 110 spans across the top of the interface structure 106 at an elevation above the conveyor belt 24. An adjustable hatch or opening 112 is built into the top panel 110 to provide across to the interior of the interface structure. A bottom panel 114 extends across the lower ends of the side panels to span between the housing 76 and chamber end walls 56.

As noted above, a side air flow chamber 86 is located along the side wall 96 of the housing 76. The side air flow chamber is composed of a vertical exterior, formed, side wall 120 spaced from the housing side wall 96 to define the width of the side chamber 86. A bottom wall 122 closes off the bottom of the side chamber 86. The top of the side chamber is defined by the hatch structure 102. The circulation fan 84 is positioned generally centrally relative to the side chamber wall 120, which is powered by motor 82 disposed outwardly of the side chamber 86. An air intake grille 124 is mounted on the exterior of side wall 120 through which intake air is provided to the side chamber 86. It will be appreciated that by locating the circulation motor 82 outwardly of the tunnel housing 76, work product, or portions thereof, being carried on the conveyor belt 24, as well as drippings or sloughings therefrom or other debris, do not fall downwardly onto the circulation motor as would be the case if the circulation motor was positioned beneath the conveyor belt 24. The air stream from the fan 84 flows up through the side chamber 86, across the top of the housing 76 and then downwardly through the ejector assembly 78, conveyor belt 24 and evacuation sheet 80 is depicted by arrows 126.

Next, referring specifically to FIGS. 4-8, the ejector assembly 78 is constructed with a perimeter frame 130 which is generally rectangular in shape and of a width to span across the conveyor belt 24. The perimeter frame 130 is constructed with formed side panels 132 positioned slightly outwardly of the conveyor belt 24 and interconnected by cross panels 134. An ejector panel or sheet 136 spans the width and length of the perimeter frame 130 and is fixedly attached thereto along a lower portion of the perimeter frame. The sheet 136 is air pervious. In this regard, the sheet 136 may be of corrugated construction with the alternating ridges 137 and grooves 138 of the sheet extending across the width of the conveyor belt.

Figure 8:
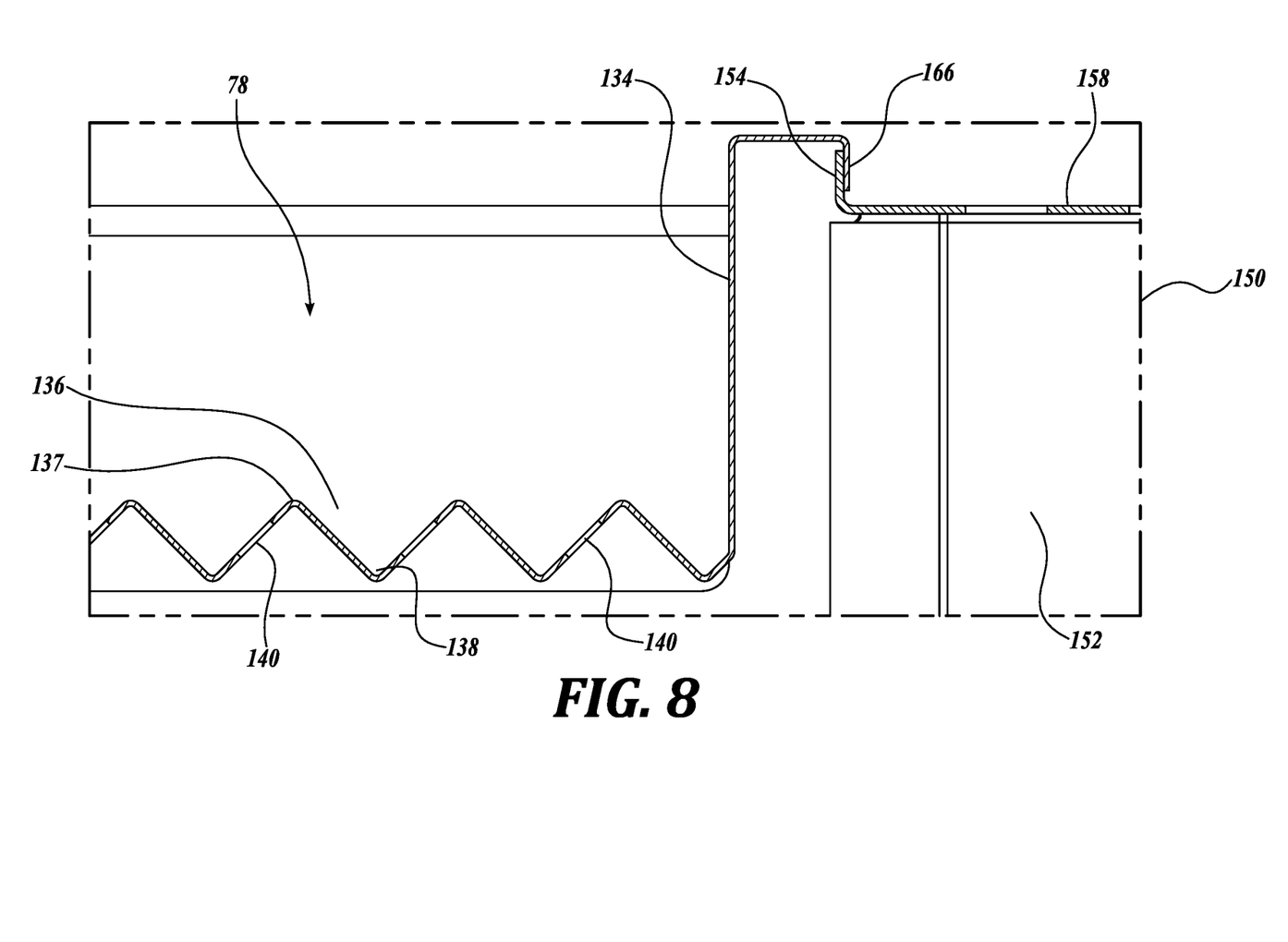
FIG. 8 is an enlarged partial cross-sectional view of a portion of FIG. 3.

Openings 140 are formed in one side of the ridges 137 so as to direct the air extending downwardly from above in a downwardly diagonal direction away from the processing chamber outlet opening 36 thereby preventing air from moving outwardly through the opening 36, see FIG. 8. In this regard, the air pressure within the tunnel 40 decreases in pressure in the direction toward the outlet opening 36 so that the air pressure over the conveyor belt at the exit end of the tunnel 40 is substantially the same as the air pressure in the ambient so as to achieve a substantially zero pressure differential with the ambient. As a consequence, neither processing chamber air or ambient air tends to seek to pass through the outlet opening 36.

The upper edge of the side panels 132 of the perimeter frame 130 are constructed with outwardly directed flanges 141 that are supported by and are slidable along corresponding underlying support flanges 142 formed at the upper edges of the housing side panels 95 and 96. As such, the ejector assembly 78 is slidable in and out of the tunnel housing 76 in a direction corresponding to the travel direction of the conveyor belt 24. This enables access to the ejector sheet 136 for cleaning or other servicing without having to lift the ejector sheet out of the housing 76. In addition, the proper positioning of the ejector assembly 78 is maintained relative to the tunnel housing 76 since the ejector assembly 78 simply slides back and forth relative to the housing and is not detached or removed from the housing per se.

Referring specifically to FIGS. 3, 4, 5 7, and 8, an air pervious cover assembly 150 is positioned over the conveyor belt 24 at a location just before the conveyor belt enters the air balance tunnel 40. The purpose of the cover assembly is to "calm down" the air flow over the conveyor at the tunnel entrance. As will be appreciated, this portion of the conveyor is near the top of the thermal processing chamber 32 and thus exposed to rapidly moving thermally treated air flowing from fan 66. By "calming down" the air adjacent the inlet of the tunnel housing 76, the air curtain generated by the air balance tunnel 40 will be more effective in seeking to create a substantially zero air pressure differential at the outlet side of the tunnel housing 76 as discussed above.

The perforated cover assembly 150 is constructed with parallel spaced apart upright side walls 152 that are interconnected by transverse end members 154 and intermediate transverse members 156 that span across the width of the cover assembly 150 to interconnect with upper edge portions of the side walls 152 thereby creating a rigid structure for the cover assembly 150. A perforated or otherwise air pervious cover or sheet 158 spans across between the two side walls 152. The perforations slow the speed of the air passing through the cover assembly and also seek to direct the passing air in a downward direction.

The cover assembly 150 is constructed with outwardly directed flanges 160 extending laterally from the lower edge portions of the side walls 152 to overlie the upper edges of rails 162 that extend outwardly from the tunnel housing 76 in the direction of and along the exterior sides of the conveyor belt 124. The rails 162 can be supported by legs or other structures. Transverse handles 164 extend upwardly from and span laterally across the top of the cover assembly 150 so as to be graspable to slide the cover assembly lengthwise along the rails 162.

The ejector assembly 78 may be connected to the cover assembly 150 to move in unison. In this regard, the ejector assembly 78 is conveniently inserted into and removed from the tunnel housing 76 by simply sliding the cover assembly along the rails 162, for example, by using manually graspable handles 164.

A connection between the ejector assembly 78 and the cover assembly 150 is achieved by a formed lip 166 extending downwardly along the upper edge of the ejector assembly end panel 134 located adjacent the cover assembly 150. The lip 166 is spaced outwardly from the exterior surface of the panel 134 so as to hook the adjacent transverse end member 154 of the cover assembly, see FIG. 8.

Figure 5:
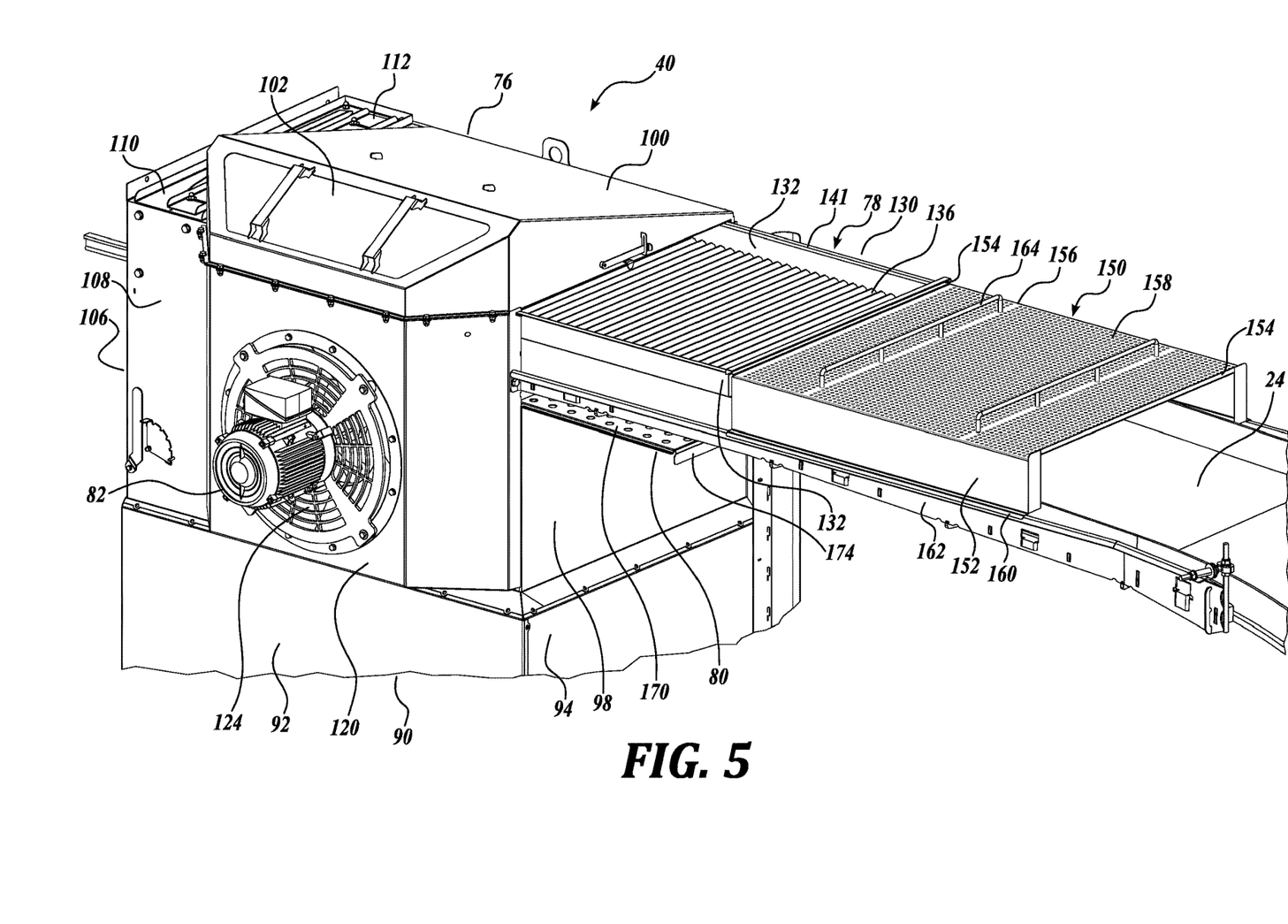
FIG. 5 is an enlarged pictorial view of a portion of FIG. 1 taken from the opposite side as FIG. 4.
Figure 6:
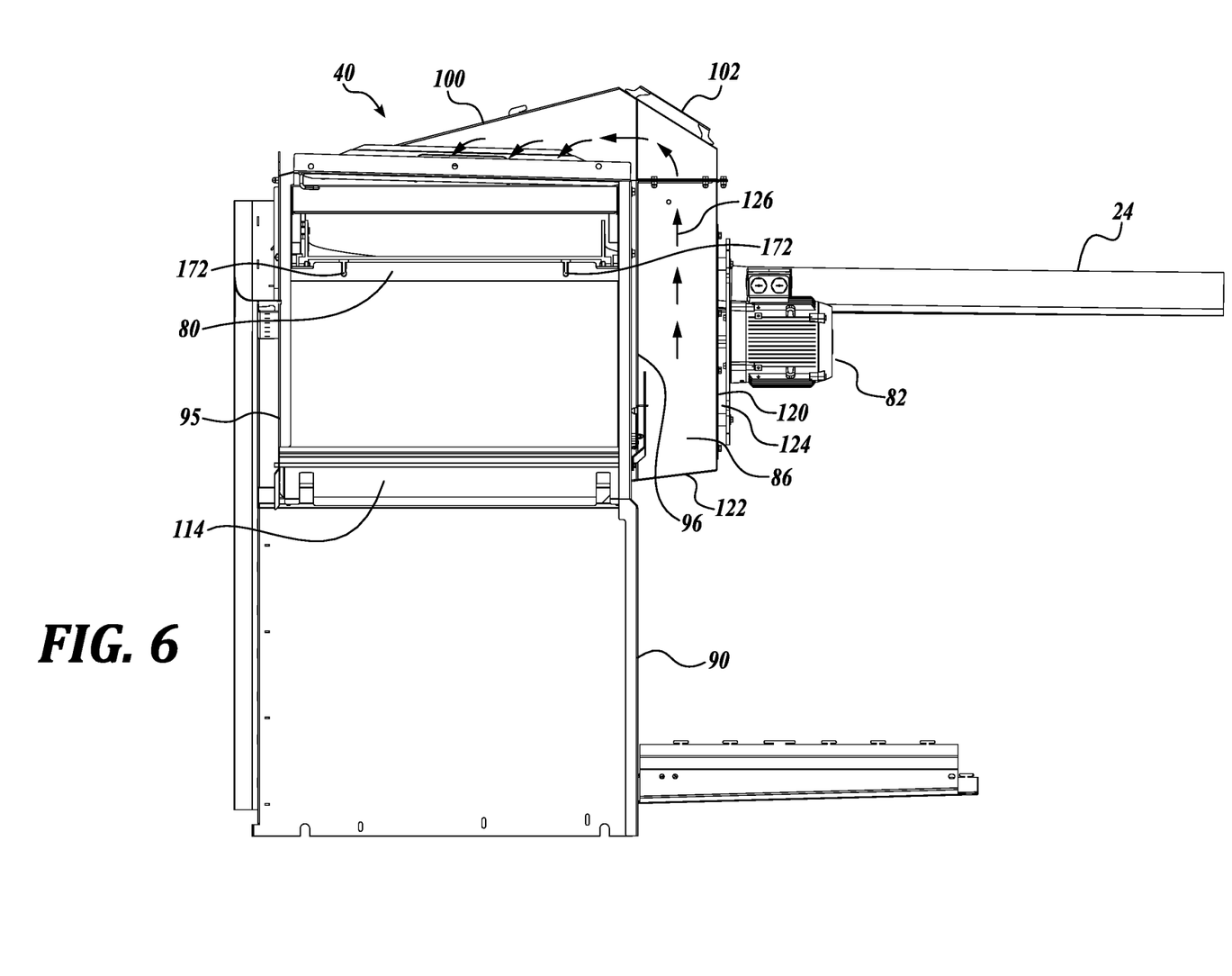
FIG. 6 is an end view of FIG. 3.
Figure 7:
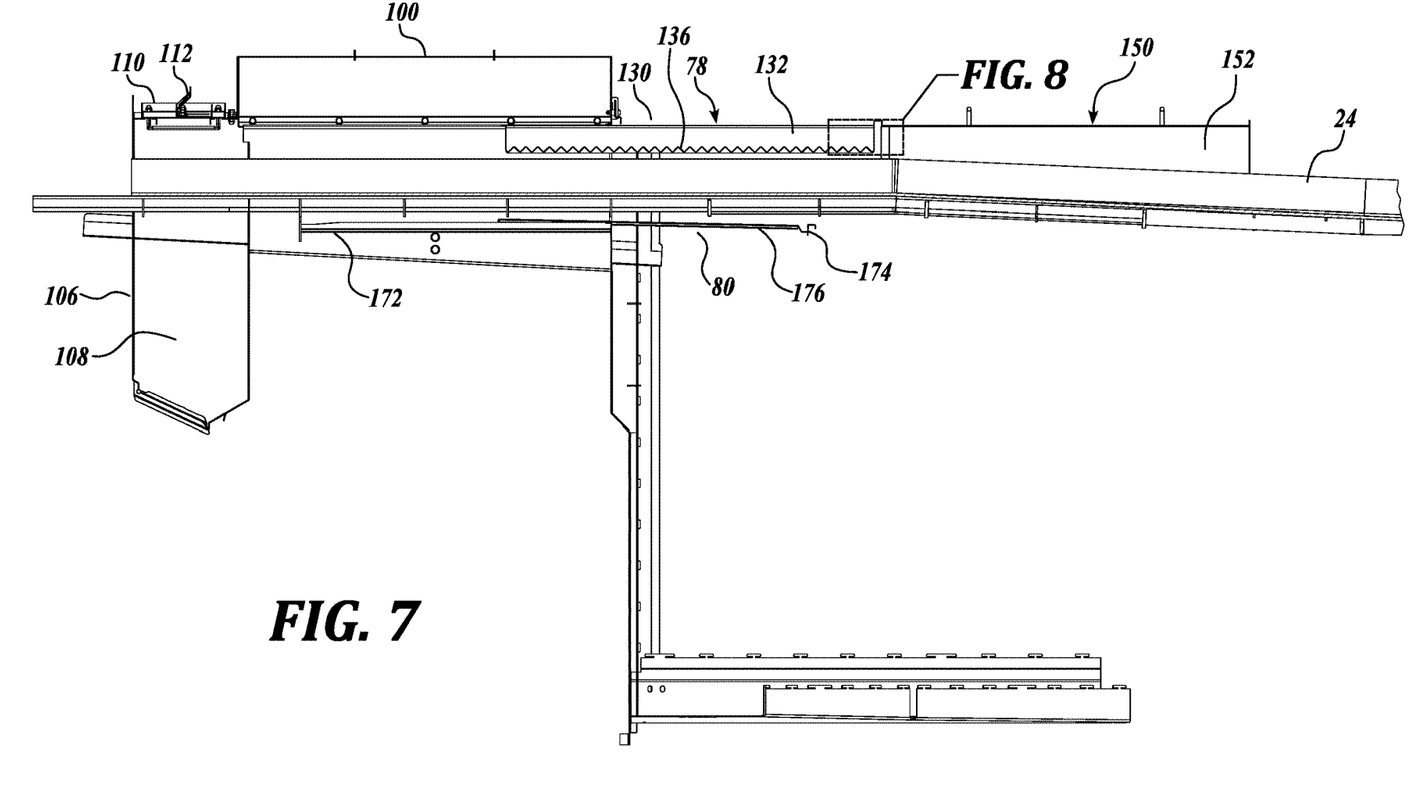
FIG. 7 is a cross-sectional view of FIG. 3 taken along lines 7-7 thereof.

Referring to FIGS. 5-7, the evacuation sheet 80 is illustrated as constructed of a perforated or otherwise air pervious sheet or panel 170 that is supported closely below conveyor belt 24 by a pair of longitudinal rails 172 disposed beneath the sheet 170. The rails are mounted within the tunnel housing 76 and supported in place within the housing. Although the evacuation sheet 80 is designed to remain stationary beneath the conveyor belt 24 on the rails 172, if need be, the evacuation sheet can be removed from the housing by sliding the unit longitudinally relative to the support rails 172. However, such removal may necessitate the partial disassembly of the rails 162 or other components so as to create clearance for the evacuation sheet. For possible removal of the evacuation sheet, a vertical edge strip 174 is attached along the edge of the sheet 170, as shown in FIGS. 5 and 7. This edge strip may be manually graspable to slide the evacuation sheet 80 relative to the tunnel housing 176 along the travel direction of the conveyor belt 24.

As noted above, one function of the evacuation sheet 80 is to evacuate the air from the tunnel 40 without creating significant horizontal air currents thereby to avoid moving the work products on the conveyor belt 24. To this end, the evacuation sheet 80 is perforated or otherwise air pervious. This causes the thermal processing air that passes through the conveyor belt 24 to travel downwardly to a zero pressure zone inside of the thermal processing housing 50, meaning that the pressure at such location is comparable to the ambient pressure. The perforations in the sheet 170 are illustrated as being round in shape, but can be of other shapes, such as square, hexagonal, octagonal, etc.

As noted above, the evacuation sheet 80 need not be removed from the tunnel housing 76, except for perhaps replacement. Access to the evacuation sheet 80 for cleaning is available through access hatch 102. An air hose, steam hose, or other cleaning fluid source may be easily directed to the evacuation sheet through the access hatch 102. Also, when the evacuation sheet is fully inserted into the tunnel housing 76, the edge strip 174, which extends beneath the bottom of the sheet 170, rests on the rails 172 thereby to position the sheet 170 at a slope extending downwardly toward the processing chamber outlet opening 36. As will be appreciated, when water or steam is used to clean the evacuation sheet 80, such liquid will flow downwardly and off of the evacuation sheet rather than seeking to remain on the evacuation sheet. This facilitates the cleaning of the evacuation sheet.

It can be appreciated that by the foregoing construction the components of the tunnel housing 76 may be conveniently cleaned without having to manually lift any of the components out of the tunnel housing as has been the case in the past. The ejector assembly 78 can be simply slid out of the tunnel housing, for example, by use of the cover assembly 150, although it is not essential that the cover assembly be used to slidably move the ejector assembly 78 along the support rails 162. Further, the evacuation sheet 80 can be simply cleaned by accessing the evacuation sheet through the access hatch 102. Because the conveyor belt 24 is pervious, the evacuation sheet 80 is accessible for cleaning.

While illustrative embodiments have been illustrated and described, it will be appreciated that various changes can be made therein without departing from the spirit and scope of the invention.

The invention claimed is:

1. An air balance system for a thermal processing system having a conveyor transporting work products into and/or out of a thermal processing chamber through one or more openings in the chamber, the system comprising:
   a. a tunnel housing positioned within the chamber at the conveyor adjacent a chamber opening, the tunnel housing configured to enable the conveyor to pass through the tunnel housing;
   b. a frame structure configured to support an air pervious ejector sheet to extend across the conveyor and along a limited longitudinal section of the conveyor adjacent a chamber opening and for movement of the ejector sheet into and out of the tunnel housing in a direction along the travel path of the conveyor; and
   c. the tunnel housing configured to direct air downwardly through the ejector sheet and through the conveyor to create an air curtain at the chamber opening through which the conveyor passes.

2. The air balance system according to claim 1, wherein the frame structure supports the ejector sheet for sliding movement out of and into the tunnel housing in a direction along the length of the conveyor to provide access to the ejector sheet.

3. The air balance system according to claim 2, wherein the tunnel housing having portions defining slideways for supporting the frame structure for sliding movement out of and into the tunnel housing.

4. The air balance system according to claim 1, wherein the tunnel housing directs air from a source of pressurized to travel along a path laterally of the conveyor to direct air to a location above the ejector sheet.

5. The air balance system according to claim 4, wherein the source of pressurized air comprises a fan driven by a power source positioned laterally to the conveyor.

6. The air balance system according to claim 1, further comprising a support structure mounted within the tunnel housing below the conveyor configured to support an air pervious evacuation sheet.

7. The air balance system according to claim 6, wherein the evacuation sheet is configured to be disposed in sloped orientation when in a fully inserted position.

8. The air balance system according to claim 6, where the evacuation sheet is supported for movement between a fully inserted position within the tunnel housing and a retracted position exterior to the tunnel housing.

9. The air balance system according to claim 8, wherein the support structure is mounted in the tunnel housing to enable the evacuation sheet to slide in and out of the tunnel housing in a direction along the length of the conveyor to provide access to the evacuation sheet.

10. The air balance system according to claim 6, wherein the tunnel housing is configured to direct air downward through the ejector sheet, downwardly through the conveyor, and downwardly through the evacuation sheet.

11. The air balance system according to claim 10, wherein the tunnel housing directs pressurized air from a source of pressurized to travel along a path laterally of the conveyor to direct air to a location above the ejector sheet.

12. The air balance system according to claim 11, wherein the source of pressurized air comprises a fan driven by a power source positioned laterally to the conveyor.

13. The air balance system according to claim 1, further comprising an air pervious cover sheet positioned over a portion of the conveyor prior to entrance into the tunnel housing.

14. The air balance system according to claim 13, further comprising flanges for supporting the cover sheet over the conveyor.

15. An air balance system for a thermal processing system having a conveyor transporting work products into and/or out of a thermal processing chamber through one or more openings in the chamber, the system comprising:
   a. a tunnel housing positioned within the chamber at the conveyor adjacent a chamber opening, the tunnel housing configured to enable the conveyor to pass through the tunnel housing;
   b. a frame structure configured to support an air pervious ejector sheet over the conveyor and for movement into and out of the tunnel housing in a direction along the travel path of the conveyor; and
   c. the tunnel housing configured to direct air through the ejector sheet and through the conveyor to create an air curtain at the chamber opening through which the conveyor passes,
   wherein the conveyor is a spiral conveyor positioned within the chamber having an outlet opening through which the spiral conveyor exits the chamber, and the tunnel housing is positioned at the spiral conveyor adjacent the chamber outlet opening.

16. An air balance system for a thermal processing system having a conveyor transporting work products into and/or out of a thermal processing chamber through one or more openings in the chamber, the system comprising:
   a. a tunnel housing positioned within the chamber at the conveyor adjacent a chamber opening, the tunnel housing configured to enable the conveyor to pass through the tunnel housing;
   b. a frame structure configured to support an air pervious ejector sheet over the conveyor and for movement into and out of the tunnel housing in a direction along the travel path of the conveyor; and
   c. the tunnel housing configured to direct air through the ejector sheet and through the conveyor to create an air curtain at the chamber opening through which the conveyor passes,
   further comprising an air pervious cover sheet positioned over a portion of the conveyor prior to entrance into the tunnel housing, and
   further comprising flanges for supporting the cover sheet over the conveyor,
   wherein the flanges support the cover sheet to move toward and away from the tunnel housing in a direction along the length of the conveyor.

17. The air balance system according to claim 16, further comprising laterally spaced apart rails projecting from the tunnel housing along the length of the conveyor for supporting the cover sheet flanges for movement along the rails in a direction along the length of the conveyor.

18. An air balance system for a thermal processing system having a conveyor transporting work products into and/or out of a thermal processing chamber through one or more openings in the chamber, the system comprising:
   a. a tunnel housing positioned within the chamber at the conveyor adjacent a chamber opening, the tunnel housing configured to enable the conveyor to pass through the tunnel housing;
   b. a frame structure configured to support an air pervious ejector sheet over the conveyor and for movement into and out of the tunnel housing in a direction along the travel path of the conveyor; and
   c. the tunnel housing configured to direct air through the ejector sheet and through the conveyor to create an air curtain at the chamber opening through which the conveyor passes,
   further comprising an air pervious cover sheet positioned over a portion of the conveyor prior to entrance into the tunnel housing,
   wherein the ejector sheet is connectable to the cover sheet to move into or out of the tunnel housing with the cover sheet as the cover sheet moves towards and away from the tunnel housing.

19. An air balance system for a chamber having a conveyor transporting work products into and/or out of the chamber through one or more openings in the chamber, the system comprising:
   a. a tunnel housing positioned within the chamber at the conveyor adjacent a chamber opening, the tunnel housing configured to enable the conveyor to pass through the tunnel housing;
   b. a frame structure configured to support an air pervious ejector sheet to extend across the conveyor and along a limited longitudinal section of the conveyor adjacent a chamber opening and for movement of the ejector sheet into and out of the tunnel housing in a direction along the travel path of the conveyor; and
   c. the tunnel housing configured to direct air downwardly through the ejector sheet and through the conveyor to create an air curtain at the chamber opening through which the conveyor passes.

20. The air balance system according to claim 19, further comprising a support structure mounted within the tunnel housing below the conveyor configured to support the air pervious evacuation sheet.

* * * * *

UNITED STATES PATENT AND TRADEMARK OFFICE
CERTIFICATE OF CORRECTION

PATENT NO. : 11,485,581 B2
APPLICATION NO. : 16/666898
DATED : November 1, 2022
INVENTOR(S) : K. Noren et al.

It is certified that error appears in the above-identified patent and that said Letters Patent is hereby corrected as shown below:

In the Claims

| Column | Line | |
|--------|------|---|
| 11 | 48 | change "pressurized to" to -- pressurized air to -- |
| 12 | 9 | change "pressurized to" to -- pressurized air to -- |

Signed and Sealed this
Sixteenth Day of April, 2024

Katherine Kelly Vidal
*Director of the United States Patent and Trademark Office*